US008563899B2

(12) United States Patent
Baranski

(10) Patent No.: US 8,563,899 B2
(45) Date of Patent: Oct. 22, 2013

(54) HEATED VEHICLE WINDOW

(75) Inventor: Detlef Baranski, Recklinghausen (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 129 days.

(21) Appl. No.: 13/126,102

(22) PCT Filed: Oct. 27, 2009

(86) PCT No.: PCT/EP2009/064164
§ 371 (c)(1),
(2), (4) Date: Jun. 14, 2011

(87) PCT Pub. No.: WO2010/049431
PCT Pub. Date: May 6, 2010

(65) Prior Publication Data

US 2011/0233182 A1 Sep. 29, 2011

(30) Foreign Application Priority Data

Oct. 27, 2008 (GB) .................................. 0819638.8

(51) Int. Cl.
*B60L 1/02* (2006.01)
*H05B 3/06* (2006.01)

(52) U.S. Cl.
USPC ........... 219/203; 219/202; 219/213; 219/214; 219/218; 219/219; 219/541; 219/542

(58) Field of Classification Search
USPC .................. 219/202–3, 213–4, 218–9, 541–2
See application file for complete search history.

(56) References Cited

U.S. PATENT DOCUMENTS

| | | | |
|---|---|---|---|
| 3,792,232 | A | 2/1974 | Zarenko |
| 5,097,270 | A | 3/1992 | Lindenmeier et al. |
| 5,099,250 | A | 3/1992 | Paulus et al. |
| 5,801,663 | A | 9/1998 | Lindenmeier et al. |
| 5,952,977 | A | 9/1999 | Taniguchi et al. |

FOREIGN PATENT DOCUMENTS

| | | | |
|---|---|---|---|
| DE | 195 27 304 | C1 | 10/1996 |
| EP | 0 396 033 | A2 | 11/1990 |
| EP | 0396033 | * | 11/1990 |
| GB | 2 232 331 | A | 12/1990 |
| WO | 2004/068643 | A | 8/2004 |
| WO | WO 2007/039747 | A1 | 4/2007 |

OTHER PUBLICATIONS

Search Report dated Jan. 12, 2009, issued by the British Patent Office in corresponding British Patent Application No. 0819638.8.
*International Search Report (PCT/ISA/210) issued on Aug. 2, 2010, by International Patent Office as the International Searching Authority for International Application No. PCT/EP2009/064164.
PCT International Preliminary Report on Patentability dated Feb. 8, 2011 issued in the corresponding PCT Application No. PCT/EP2009/064164.

* cited by examiner

*Primary Examiner* — Shawntina Fuqua
(74) *Attorney, Agent, or Firm* — Buchanan & Ingersoll & Rooney PC

(57) ABSTRACT

A heated vehicle window includes at least one ply of a glazing material, provided with an antenna and an array of electrical conductors forming a heating circuit. The heating circuit comprises a plurality of electrical conductors and at least two busbars for supplying direct electrical current to which the electrical conductors are connected. A discrete electrically conductive layer is provided to cover at least a portion of at least two of the busbars in direct current electrical isolation therefrom. The busbars and the discrete electrically conductive layer act as a capacitor in the presence of alternating electrical current.

24 Claims, 8 Drawing Sheets

PRIOR ART

HEATED VEHICLE WINDOW

The present invention relates to a heated vehicle window, in particular a heated vehicle window comprising an array of electrical conductors forming a heating circuit.

In wet and/or humid conditions, vehicle windows may become misted or fogged over, making it difficult for a driver to see objects outside of the vehicle. In cold weather conditions, a vehicle window may become iced over, again obscuring the view of the driver. It is well known to provide heating circuits, in particular on vehicle backlights, but also within vehicle windscreens and on some vehicle sidelights, to overcome such obscuration problems. These heating circuits are generally formed in one of three ways: firstly, by providing an array of heating lines on the inner surface of the window, printed using an electrically conductive ink; secondly by providing an electrically conductive coating across one of the plies of glass forming a laminated window; or thirdly, by providing an array of heating wires embedded within the interlayer material bonding the plies of glass forming a laminated window together. To this end, many designs of heating lines and wire arrays, as well as types of coatings are known, and employed within a variety of vehicle window designs.

Each type of heated window requires connection to a suitable power supply, for example, a 12V electrical supply of the vehicle in which it is fitted in order to pass current to the heating circuit or coating. This is done by means of busbars: regions of electrically conductive material, either printed or formed from a tinned copper strip, in contact with each of the lines/wires or coating, which are then connected by means of a soldered connector to an external wiring system. The design of the busbar (its thickness, size, material) is determined by the type of heating circuit, and also by the need to ensure that in a heating line or wire array it is necessary to ensure that each conductor in the array experiences the same current and voltage drop. If this is not the case, non-uniform current density may be an issue, leading to hot spots appearing within the heating circuit, which over time, may ultimately damage the circuit and lead to failure of the heated window.

In the case of a backlight, it is also common to include an antenna line, either printed onto a single ply backlight (which may be of a glass or a plastic glazing material) or as a wire within a laminated backlight. The antenna lines are also connected to the vehicle wiring system by means of a busbar, which may be part of a busbar used for the heating circuit. The design of each of the busbars for the heating circuit and the antenna is also influenced by the electrical effect of that busbar on the reception behaviour of the antenna. In particular, it is necessary that there is no attenuation of the antenna signal due to the operation of the heating circuit.

A schematic plan view of a typical heated vehicle window is shown in FIG. 1. The vehicle window 10 comprises a single ply of toughened glass, and is used as a backlight. A heating circuit 11 is provided on the inner surface of the vehicle window 10 by means of an array of printed lines 12_a_-12_v_ formed from a fired electrically conductive silver-containing ink. Each printed line 12_a_-12_v_ extends horizontally between a first 13_a_ and a second 13_b_ busbar, also formed from a fired electrically conductive silver-containing ink. Each busbar allows direct current (DC) to be supplied to the printed lines 12_a_-12_v_. A second printed region, known as an obscuration band 14, is provided around the periphery of the vehicle window 10. The obscuration band 14 is formed from a fired non-electrically conductive ceramic ink, which appears black in colour on the vehicle window 10. The purpose of the obscuration band is two-fold: firstly to hide the join between the vehicle window 10 and the aperture in a vehicle body in which it sits; and secondly, to protect the adhesive used to bond the vehicle window 10 into the aperture from exposure to ultra-violet light. In addition to the heating circuit 11, an antenna 15 is also provided. The antenna 15 comprises a connection point 16 from which three antenna lines 17_a_, 17_b_, 17_c_ extend in a "T" shape. One antenna line 17_b_ extends vertically downwards from the connection point 16 across the array of printed lines 12_a_-12_v_. During operation of the antenna, this antenna line 17_b_, in co-operation with the heating circuit 11 acts as a flat plate conductor that effectively acts as an antenna when conducting AC (alternating current). This effect is discussed in, for example, DE19527304C1 and U.S. Pat. No. 5,099,250.

The actual design of the heating circuit 11 in FIG. 1 is greatly simplified for ease of understanding. Typically the printed lines 12_a_-12_v_ are curved to match the contours of the glazing, such that they appear horizontal to a viewer of the vehicle window 10. In addition, the design of the antenna 15 is more complex in reality. The ideal operating range of such an antenna is between 50 and 150 MHz, for the FM band, and 150-250 MHz for TV- or DAB-band.

However, with the current trend towards smaller vehicles being provided with windows having a greater degree of complex curvature (curvature in both x- and y-directions), the design of the heating circuits must be tailored to meet the customers' needs, resulting in varied and complicated designs. This is particularly the case where the vehicle window is relatively small, for example, the backlight in a hatchback, or a sidelight or rear quarter. In addition, if an antenna is to be included in such a vehicle window, care must be taken with the busbar design as well as that of the basic heating circuit, to ensure that the antenna functions with no attenuation. This may require that the busbar be split into smaller regions, which itself can bring difficulties. An example of this situation is shown in FIG. 2.

FIG. 2 is a schematic drawing of a heating circuit design for a backlight. The heating circuit 20 comprises an array of semi-circular printed lines 21_a_-21_g_, formed from a fired electrically conductive silver-containing ink. The printed lines 21_a_-21_g_ are connected to a vehicle electrical supply by means of a series of busbars 22_a_ to 22_e_. The printed lines 21_a_-21_g_ and busbars 22_a_-22_e_ are connected to each other as follows:

the first printed line 21_a_ is connected to the first busbar 22_a_ and the second busbar 22_b;_ the second printed line 21_b_ is connected to the first busbar 22_a_ and the third busbar 22_c;_ the third printed line 21_c_ is connected to the first busbar 22_a_ and the fourth busbar 22_d;_ the fourth printed line 21_d_ is connected to the first busbar 22_a_ and the fifth busbar 22_e;_ the fifth printed line 21_e_ is connected to the second busbar 22_b_ and the fifth busbar 22_e;_ the sixth printed line 21_f_ is connected to the second busbar 22_b_ and the fourth busbar 22_d_; and the seventh printed line 21_g_ is connected to the second busbar 22_b_ and the third busbar 22_c_.

Thus, the following connections are made:

the fourth printed line 21_d_ is joined to the fifth printed line 21_e_ by the fifth busbar 22_e;_ the third printed line 21_c_ is joined to the sixth printed line 21_f_ by the fourth busbar 22_d_; and the second printed line 21_b_ is joined to the seventh printed line 21_g_ by the third busbar 22_c_.

These connections ensure that there are effectively four electrical conductors within the heating circuit 20 having approximately the same length, ensuring equal current density and voltage drop across the heating circuit 20.

However, whilst this design is ideal for the function of the heating circuit 20, when an antenna is included on the same window, difficulties arise. Unlike the heated vehicle window design shown in FIG. 1, it is not possible to include a vertical antenna line between arrays of heating lines in the heating circuit 20 shown in FIG. 2. This would cause a DC (direct current) short circuit, meaning that neither heating circuit 20 nor antenna would function. To overcome this, it is necessary to rely on the busbar design to provide the flat plate conductor functionality. To do this successfully, the busbars should be connected for AC (alternating current) current, but the busbars are separated from each other by the design of the DC heating circuit. However, as can be seen in FIG. 2, the busbars 22*a*-22*e* are of differing sizes as dictated by the design of the heating circuit 20. Consequently, a solution to the problem of creating a flat plate susceptible to AC currents for antenna functionality is required.

The present invention aims to address the above problems by providing from a first aspect a heated vehicle window comprising at least one ply of a glazing material, provided with an antenna and comprising an array of electrical conductors forming a heating circuit, the heating circuit comprising a plurality of electrical conductors and at least two busbars for supplying direct electrical current to which the electrical conductors are connected, wherein a discrete electrically conductive layer is provided to cover at least a portion of at least two of the busbars in direct current electrical isolation therefrom, such that the busbars and the discrete electrically conductive layer act as a capacitor in the presence of alternating electrical current.

By creating a capacitive connection in the presence of AC current, a flat plate as required for antenna function is created.

There may be one or more discrete electrically conductive layers.

Preferably, the discrete electrically conductive layer is bonded to the busbar by means of an electrically insulating adhesive layer.

Preferably, n busbars are provided, where n is an integer number, and greater than or equal to two, and the number of discrete electrically conductive layers is in the range of 1 to n−1.

When n is at least three, preferably a direct electrical connection may be made between one of these three busbars and the discrete electrically conductive layer covering that busbar. The direct electrical connection may be used to connect the heating circuit to a direct current source.

The antenna may be provided independently of the heating circuit. In a preferred embodiment, the antenna is configured to be a part of the heating circuit.

The present invention also provides from a second aspect a heated vehicle window comprising at least one ply of a glazing material, provided with an antenna and comprising an array of electrical conductors forming a heating circuit, the heating circuit comprising a plurality of electrical conductors and at least two busbars for supplying direct electrical current to which the electrical conductors are connected, wherein a discrete electrically conductive layer is provided to cover at least a portion of at least two of the busbars, such that the busbars and the discrete electrically conductive layer act as a capacitor in the presence of alternating electrical current, and wherein there is a direct electrical connection between one of the at least two busbars and the discrete electrically conductive layer.

Again by creating a capacitive connection in the presence of AC current, a flat plate as required for antenna function is created.

Preferably n busbars are provided, where n is an integer number, and greater than or equal to two, and the number discrete electrically conductive layers is in the range of 1 to n−1.

Preferably the discrete electrically conductive layer is bonded to the busbars by means of an electrically insulating adhesive layer.

Whilst the antenna may be provided independently of the heating circuit, it is preferred that the antenna is configured to be a part of the heating circuit.

The direct electrical connection may be used to connect the heating circuit to a direct current source.

For either the first or second aspect of the present invention, certain embodiments have the following preferable features.

Preferably, the discrete electrically conductive layer is formed from a metallic thin sheet material. The metallic thin sheet may be bonded to the busbar by a double-sided adhesive tape.

Alternatively, the discrete electrically conductive layer is a layer of a fired electrically conductive ink. The electrically conductive ink may be a silver-containing ink. The discrete electrically conductive layer may be isolated from the busbar by means of an electrically insulating fired ink.

The discrete electrically conductive layer may be provided with an outer protective layer. This outer protective layer may be a self-adhesive polymer film. Alternatively, the outer protective layer may be a printed black ceramic material.

Preferably, the electrical conductors are heating lines printed with an electrically conductive silver-containing ink.

Preferably, the heated vehicle glazing comprises a single ply of a glazing material.

Alternatively, the heated vehicle glazing may comprise two plies of a glazing material bonded together by a layer of an interlayer material. In this case, the electrical conductors may be formed from metal wires.

Preferably, the glazing material is silicate float glass. A layer of a printed black ceramic material may be provided between the silicate float glass and the electrical conductors.

Alternatively, the glazing material may be a plastics material.

The discrete electrically conductive layer may act as an antenna connector.

The discrete electrically conductive layer may be adapted to produce another antenna having a resonant frequency of at least 100 MHz.

The other antenna may comprise a second electrically conductive layer, in direct current electrical isolation from the discrete electrically conductive layer. The second electrically conductive layer may be adjacent the discrete electrically conductive layer, or may overlap or cover the discrete electrically conductive layer. Alternatively, the other antenna may be formed from a portion of the discrete electrically conductive layer.

The present invention is described by way of example only, and with reference to the accompanying drawings, in which:

FIG. 1, referred to above, is a schematic plan view of a typical heated vehicle window;

FIG. 2, referred to above, is a schematic drawing of a heating circuit design for a backlight;

FIG. 3*a* is a schematic drawing of a heating circuit design for a backlight with a discrete electrically conductive layer in accordance with a first embodiment of the present invention;

FIG. 3*b* shows circuit diagram representation of the heating circuit design of the prior art (upper diagram) and that shown in FIG. 3*a* (lower diagram);

Figure 7A:
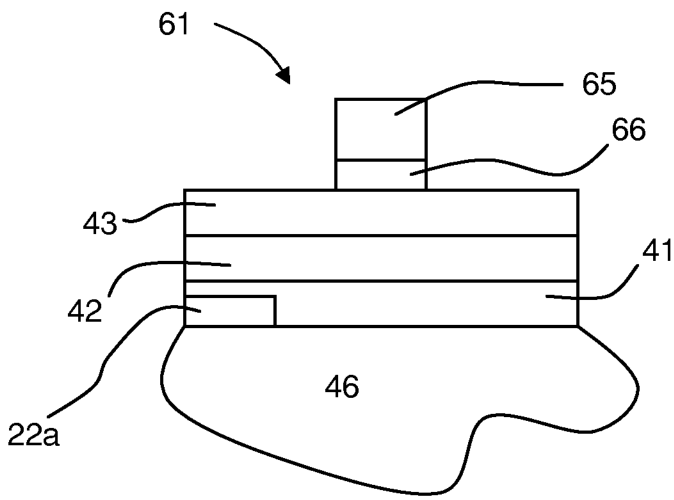
Figure 7B:
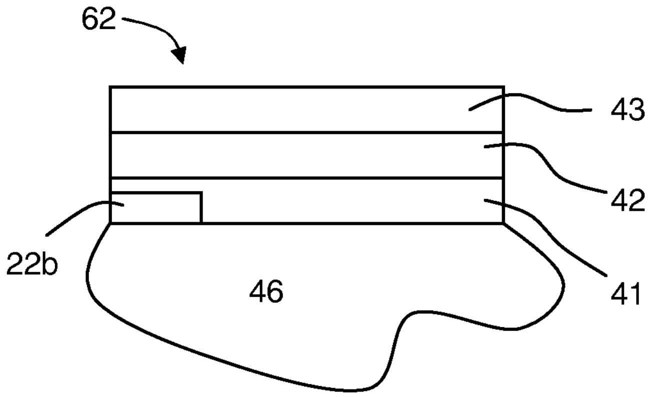
Figure 7C:
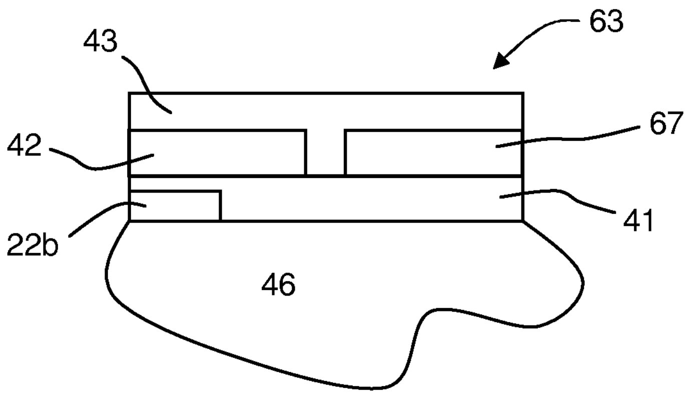

FIG. 7*a* is a schematic cross-section view showing a portion of a first antenna provided in accordance with the fourth embodiment of the present invention;

FIG. 7*b* is a schematic cross-section view showing a portion of a second antenna provided in accordance with the fourth embodiment of the present invention; and FIG. 7*c* is a schematic cross-section view showing a portion of a third antenna provided in accordance with the fourth embodiment of the present invention.

Figure 1:
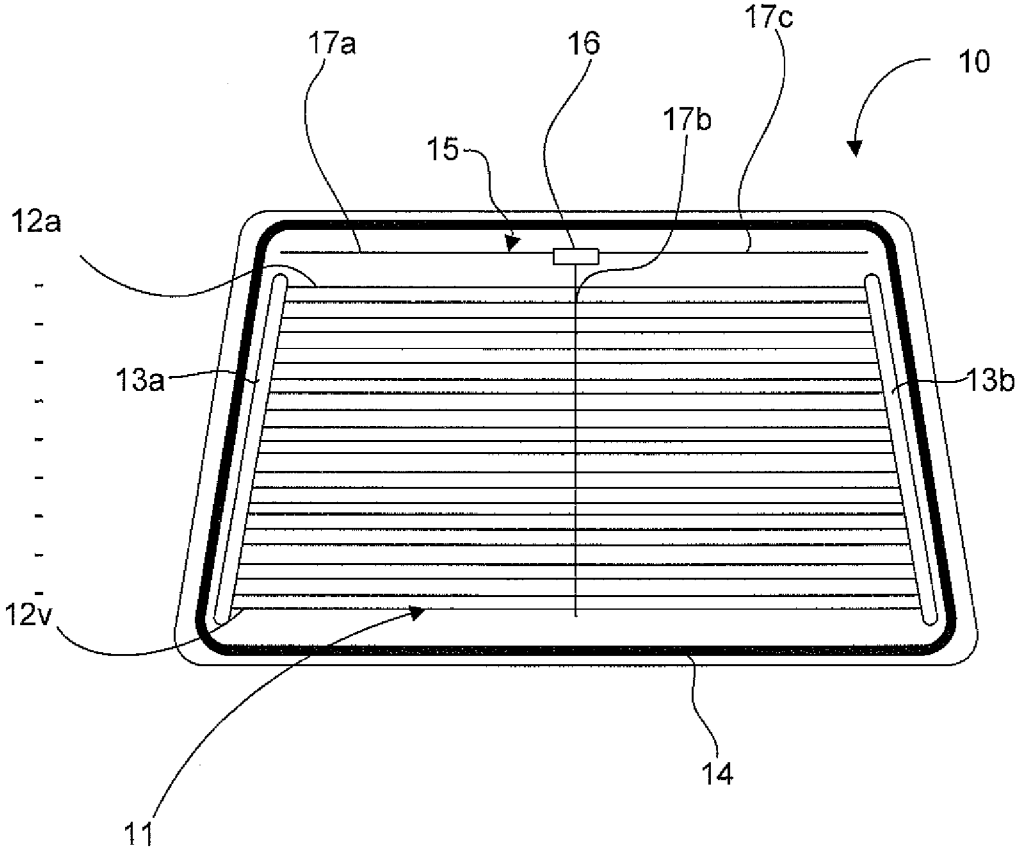
Figure 2:
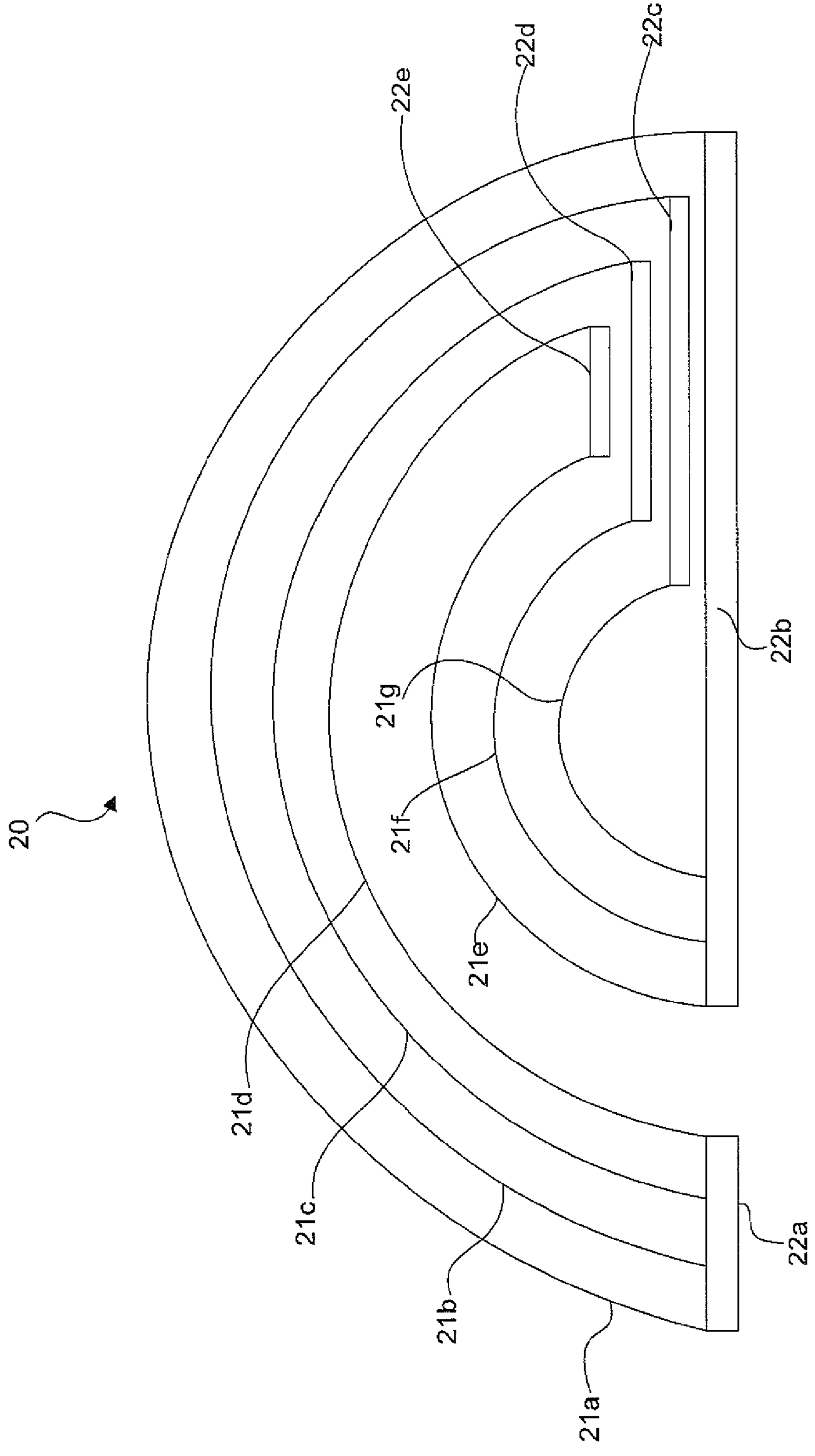

A flat plate conductor can be formed using the busbar design shown in FIG. 2 by artificially creating a single capacitor by arranging a number of individual capacitances in series. This could be done simply by soldering individual capacitors between the busbars. However, this solution is less than ideal. At present, solders used in vehicle glazings contain lead to aid in adhesion and durability, but there is a move towards using lead-free solders or using solderless solutions. In addition, any capacitors soldered onto the interior of a vehicle window would be visible from within the vehicle, which is unacceptable from an aesthetic point of view, unless suitably covered. A cover would enhance the durability of this solution, preventing damage to the capacitors and solder, but even using a cover is non-ideal, as such a cover would also be clearly visible from within the vehicle.

In the present invention, it has been appreciated that it is possible to create a flat plate conductor by using the busbars themselves to form flat plate capacitors, with each busbar acting as a plate such that neighbouring busbars form the bottom plates of capacitors connected in series. Consequently, although DC current is supplied to the heating circuit to heat the vehicle window, as antenna operation requires AC current, the busbars form part of these capacitors during antenna operation when AC current flows. The upper plate of these capacitors is provided by a discrete electrically conductive layer, provided in direct current electrical isolation from the busbars, as described in more detail below. This is particularly suitable in heating circuit designs where at least two busbars are provided.

Figure 3A:
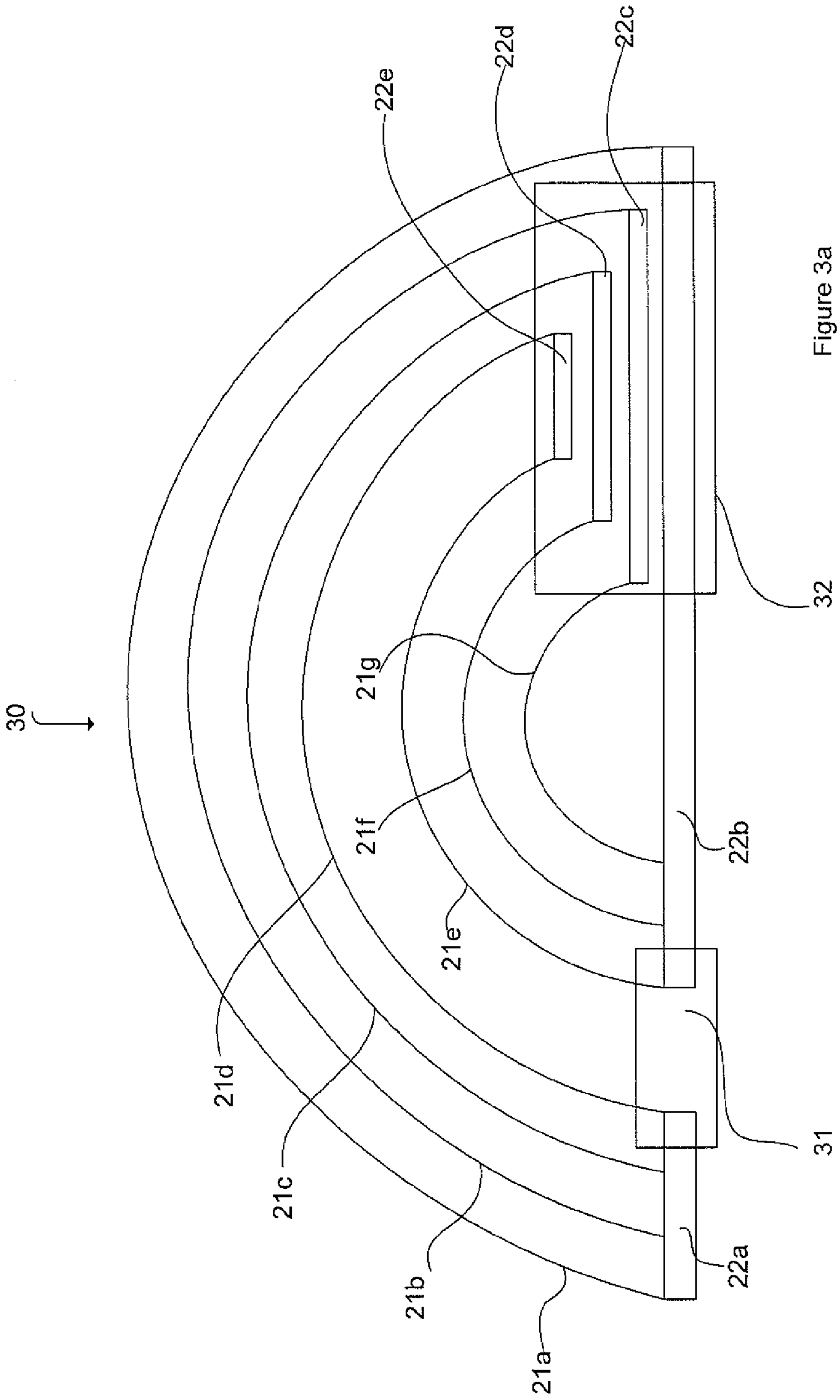

FIG. 3*a* is a schematic drawing of a heating circuit design for a backlight with a discrete electrically conductive layer in accordance with a first embodiment of the present invention. The backlight may be a single ply of a glazing material or a laminated construction comprising two plies of a glazing material bonded together by a layer of an interlayer material such as polyvinyl butyral (PVB). The glazing material may be a ply of silicate float glass, and as such may be toughened, semi-toughened or annealed, or may be a ply of a plastics material, such as polycarbonate. The design of the heating circuit 30 is essentially the same as that shown in FIG. 2 above, and will not be described further, with like reference numerals being used in FIG. 3 to indicate like features. In order to form two flat plate conductors, two discrete electrically conductive layers 31, 32 are shown in outline. A first discrete electrically conductive layer 31 is provided to cover at least a portion of each of the first busbar 22*a* and the second busbar 22*b*. A second discrete electrically conductive layer 31 is provided to cover at least a portion of each of the second 22*b*, third 22*c*, fourth 22*d* and fifth 22*e* busbars.

Figure 3B:
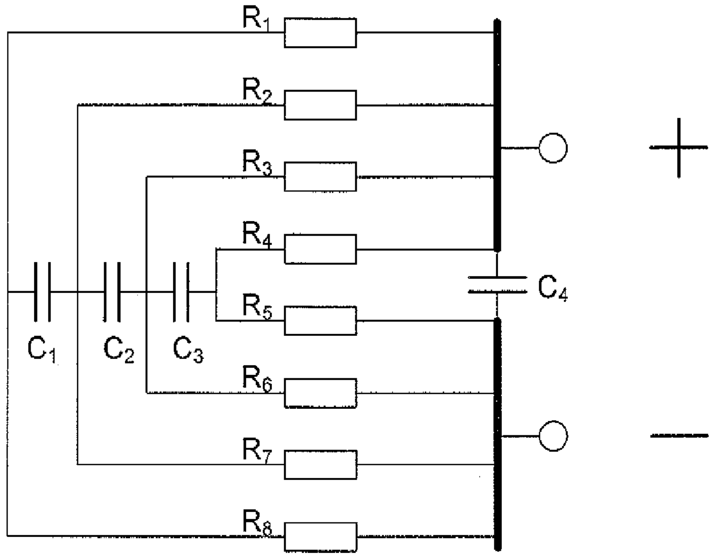
Figure 3B:
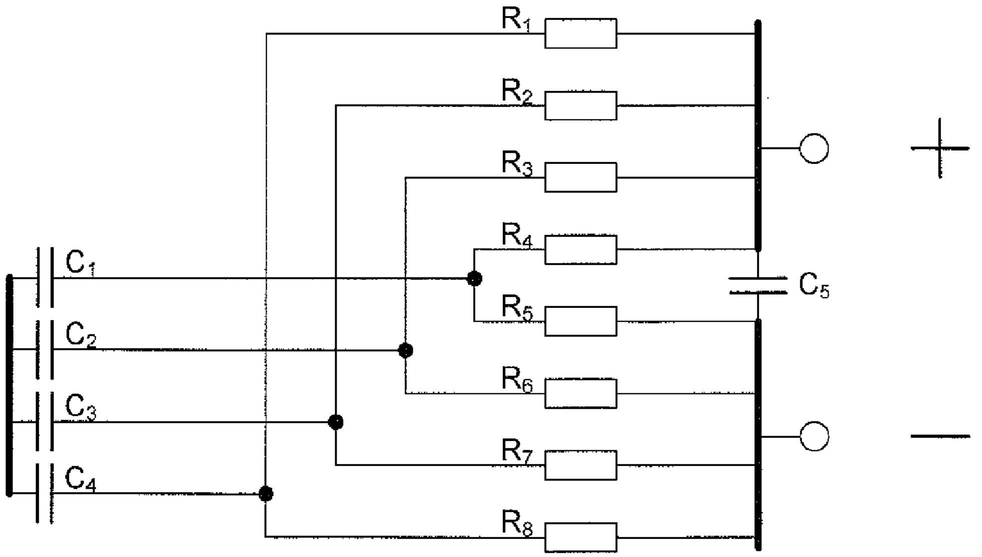

FIG. 3*b* shows circuit diagram representation of the heating circuit design of the prior art (upper diagram) and that shown in FIG. 3*a* (lower diagram). In each diagram, the heating lines are represented as resistive loads $R_1$, $R_2$, $R_3$, $R_4$, $R_5$, $R_6$, $R_7$, $R_8$. In the first diagram, representing the prior art approach, each load is connected in series with a positive/negative power source. Each of the loads is also connected in series with a capacitance $C_1$, $C_2$, $C_3$. A further capacitor $C_4$ is connected between the positive and negative terminals. These capacitances are representative of the capacitors required to join between the busbars to create the flat plate required for antenna function. However, the disadvantage of this approach is that three capacitances are connected in series, resulting in a reduction in the overall capacitance of the circuit.

In the second diagram, representing the approach of the present invention, the use of the discrete electrically conductive layer 32 to connect the busbars results in four capacitances $C_1$, $C_2$, $C_3$, $C_4$ being connected in parallel. These four capacitors may be represented by a single capacitor. One of the busbars remains connected in series, which due to the effect of the discrete electrically conductive layer 31 creates a further capacitance $C_5$. The capacitor $C_5$ may be represented by two capacitors connected in series, one capacitor being associated with each busbar 22*a*, 22*b*/discrete electrically conductive layer combination. The overall capacitance of the circuit is in the range of the prior art circuit, and consequently the busbars 22*a*-22*e* and discrete electrically conductive layers 31, 32 act more efficiently as a flat plate conductor in the presence of AC current. Therefore, any antenna provided on the same backlight as the heating circuit 30 functions without attenuation. Although in this example, five busbars are provided, the number and design of busbars and also therefore the discrete electrically conductive layers may vary. Consequently, where n busbars are provided (where n is an integer number, and preferably greater than or equal to two) at least one, and preferably one to n−1 discrete electrically conductive layers may be used, as desired. For example, the heating circuit shown in FIG. 3*a* is provided with two discrete electrically conductive layers and five busbars, such that n=5 and the number of discrete electrically conductive layers is two. Alternatively, the heating circuit shown in FIG. 3*a* may be provided with a single discrete electrically conductive layer covering all five busbars, hence n=5 and the number of discrete electrically conductive layers is one. The structure is described in more detail with reference to FIG. 4 below. In addition to the AC short circuit function provided by the discrete electrically conductive layers, each may act as an antenna connector, connecting the flat plate created during AC operation with an antenna receiver, transmitter or amplifier. In this situation, the discrete electrically conductive layer may be connected with these antenna components by means of a wire, or directly, depending upon the position of the discrete electrically conductive layer and the antenna component on the heated vehicle window. Such an antenna preferably resonates in a frequency range of 10 to 200 MHz.

Figure 4:
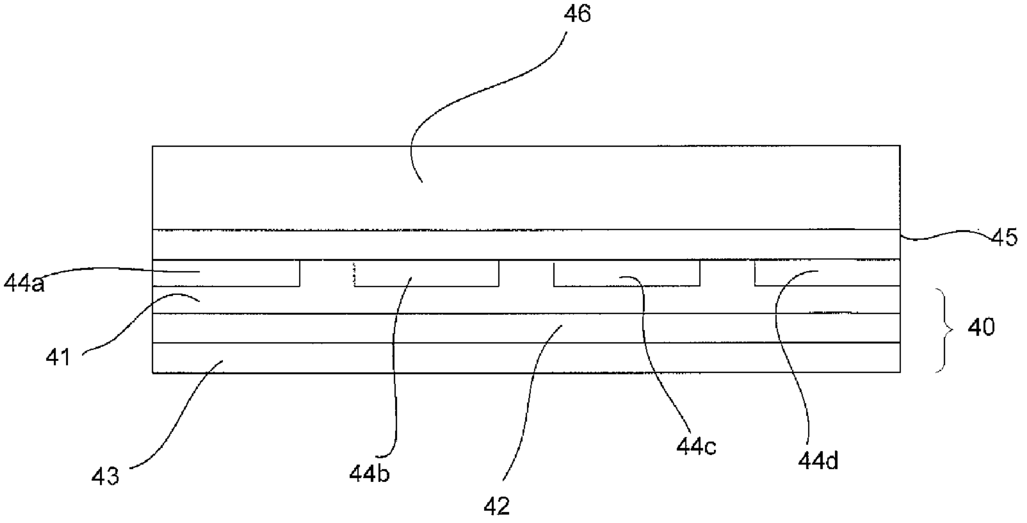
FIG. 4 is a schematic cross-section of the discrete electrically conductive layer in accordance with the first embodiment of the present invention positioned on a heating circuit.

FIG. 4 is a schematic cross-section of the discrete electrically conductive layer in accordance with the first embodiment of the present invention positioned on a heating circuit. The figure is representative of a side view of the second 22*b*, third 22*c*, fourth 22*d* and fifth 22*e* busbars shown in FIGS. 2 and 3. The capacitor 40, created by the busbars and discrete electrically conductive layer, comprises an electrically insulating adhesive layer 41, a discrete electrically conductive layer 42 and an optional outer protective layer 43. It will be readily apparent to one skilled in the art, and with reference to the lower diagram in FIG. 3*b*, that capacitor 40 is an effective capacitor arising from four capacitors connected in parallel. The capacitor 40 is shown in position over four busbars 44*a*-44*d*, formed from a fired electrically conductive silver-containing ink, and which are in turn in located on a layer of a black, ceramic printed material 45 covering a portion of the inner surface of a ply of glass 46. The adhesive layer 41 of the capacitor 40 is in contact with both the busbars 44*a*-44*d* and the black ceramic printed material 45. The adhesive layer 41 is electrically insulating, and provides direct current isolation between the electrically conductive layer 42 of the capacitor 40 and the four busbars 44*a*-44*d*. In this manner, the capacitor 40 is formed as a flat plate capacitor by the four busbars 44*a*-44*d* (acting as the bottom plate) and the electrically conductive layer 42 (acting as the upper plate), with the adhesive material replacing the air gap found in a conventional flat plate capacitor, in the presence of AC current.

The discrete electrically conductive layer 42 covers at least a portion of the busbar 44*a*-44*d*. Preferably, the discrete electrically conductive layer 42 is formed from a thin metallic sheet material, having a thickness in the range 10 to 500 μm. Suitable materials include thin metallic sheets formed from copper, silver, gold, nickel, iron and electrically conductive alloys. The adhesive layer 41 is preferably a double-sided adhesive tape, such adhesive transfer tapes, product codes 941, 965, 966, 9461P, 9461PC and 9462P available from 3M, or Tanslink 50r, 30+ or Customlink 1228 tape products available from Biolink UK Ltd. Preferably, the adhesive layer has a thickness in the range 10 to 100 μm. It is preferable to provide an electrically insulating covering layer on either side of the discrete electrically conductive layer, in particular if this is formed from a thin metallic sheet material. Such covering layers are provided to prevent water ingress and prevent the electrically conductive material from corrosion.

The discrete electrically conductive layer in FIG. 4 also comprises an optional outer protective layer 43. As the layer does not affect the capacitive function of the capacitor 40, it may be omitted if desired. However, the use of such a protective layer has several advantages. Firstly, the layer offers protection from abrasion of the electrically conductive layer 42 during cleaning of the window. Secondly, if a layer matching the obscuration band print present around the edge of the vehicle window (the ceramic printed material 45 shown in FIG. 4) is provided, the discrete electrically conductive layer becomes effectively invisible to a viewer looking at the busbar region from both inside and outside a vehicle. Preferably, the outer protective layer 43 has a thickness in the range 40 to 100 μm, and may comprise an adhesive layer and a thin polymer film layer, such as KAPTON (polyamide tape available from DuPont), for example, AKAFLEX products, available from August Krempel Soehne GmbH+Co. KG, or flat cable tapes available from GTS Flexible Materials Ltd. Alternatively, the outer protective layer 43 may be formed from an additional printed ceramic material, matching the obscuration band on the heated vehicle window.

An alternative design is to use a series of printed layers to form the busbar structure and to form the capacitor comprising the busbar and the discrete electrically conductive layer. This may be achieved by printing a layer of a non-electrically conductive ink over the surface of the busbar, to create an electrically insulating layer, and then printing a region of electrically conductive ink, such as the same silver-containing electrically conductive ink, over the insulating layer to create the discrete electrically conductive layer. The layer of non-electrically conductive ink forming an insulating layer effectively forms a direct current isolator (i.e. an electrical insulator) between the busbar and discrete electrically conductive layer. A further layer of non-electrically conductive ink can be printed over the surface of the discrete electrically conductive layer as a protective layer. In this example the black ceramic ink used to form an obscuration band can be used as both the insulating and the protective layer. A self-adhesive protective layer, as described above, may be used instead if desired.

In FIG. 4, the busbars 44*a*-44*d* are shown as being in contact with a layer of a black, ceramic printed material 45 covering a portion of the inner surface of a ply of glass 46. However, it may be desirable to provide the busbars 44*a*-44*d* in direct contact with the inner surface of the ply of glass 46, depending on the design and aesthetic requirements of the heated vehicle window. In addition, a layer of a black, ceramic printed material may also be provided to cover the busbars 44*a*-44*d*, such that if a thin metallic sheet material is used to form the discrete electrically conductive layer, any electrically insulating adhesive layer required is placed in contact with this additional printed layer.

Figure 5:
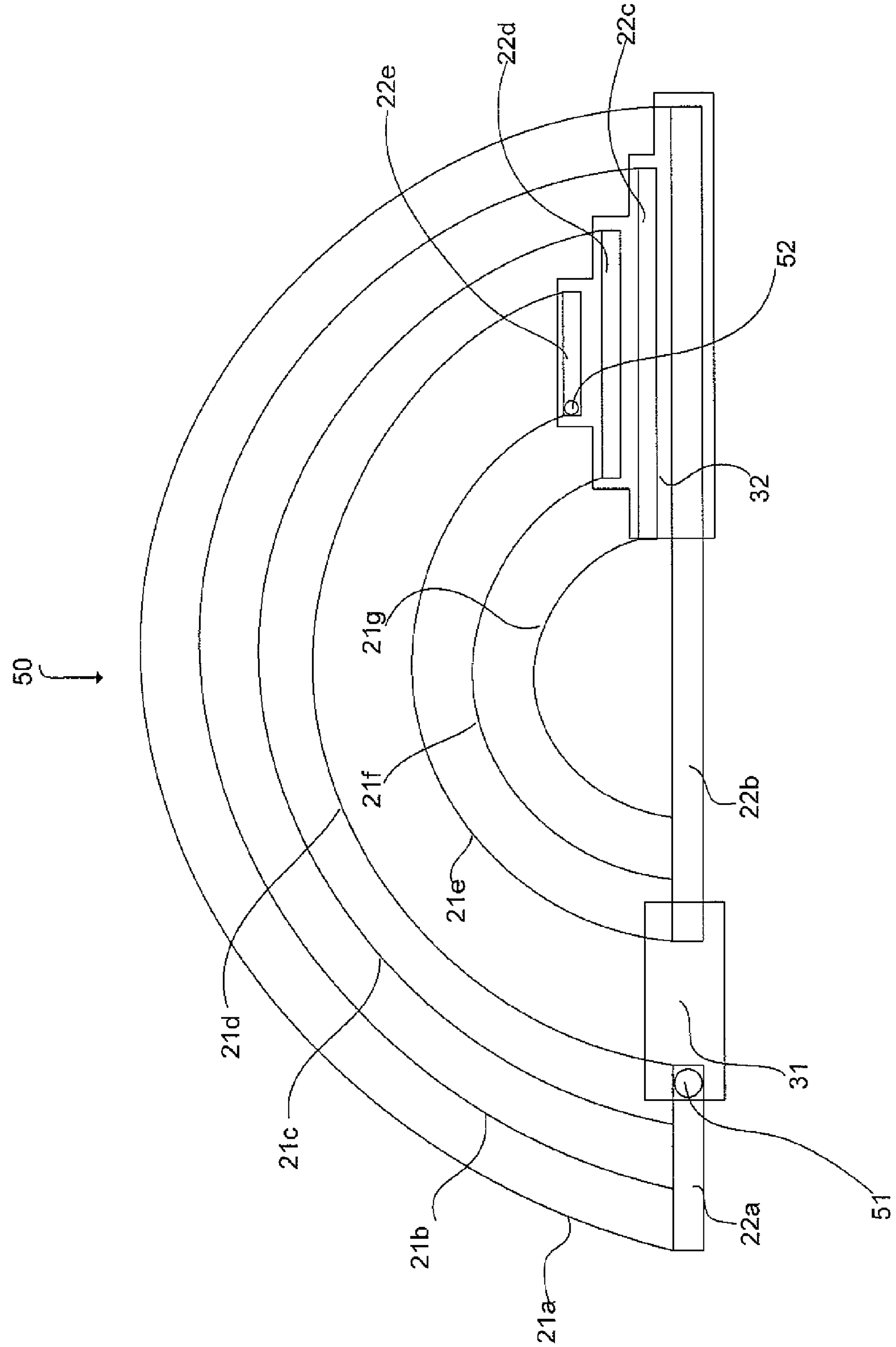
FIG. 5 is a schematic drawing of a heating circuit design for a backlight with a discrete electrically conductive layer in accordance with a third embodiment of the present invention.

FIG. 5 is a schematic drawing of a heating circuit design for a backlight with two discrete electrically conductive layers in accordance with a third embodiment of the present invention. Again, the design of the heating circuit 50 is essentially the same as that shown in FIGS. 2 and 3*a* above, and will not be described further, with like reference numerals being used in FIG. 5 to indicate like features.

In order to form two flat plate conductors, two discrete electrically conductive layers 31, 32 are shown in outline. A first discrete electrically conductive layer 31 is provided to cover at least a portion of each of the first busbar 22*a* and the second busbar 22*b*. A second discrete electrically conductive layer 32 is provided to cover at least a portion of each of the second 22*b*, third 22*c*, fourth 22*d* and fifth 22*e* busbars. To reduce the issue of the number of series capacitances further, direct electrical connections 51, 52 are provided between both the first discrete electrically conductive layer 31 and the first busbar 22*a* and the second discrete electrically conductive layer 32 and the fifth busbar 22*e*. By creating a direct electrical connection, for example by soldering or using an electrically conductive adhesive, a non-capacitive connection is formed, and the number of series capacitances created overall is reduced. If desired, only a single direct electrical connection 51, 52, may be used, depending on the design of the heating circuit 50 and antenna performance requirements. As also shown in FIG. 5, the design of the discrete electrically conductive layer may be altered to fit the exact footprint of the busbars, or to give a desired aesthetic appearance. This direct electrical connection 51, 52 may be used to connect the heating circuit to a DC (direct current) source.

In each of the above embodiments, the heating circuit 30, 50, comprises an array of printed heating lines, as the vehicle window carrying such a heating circuit is typically a single ply toughened glazing. However, the same concept can be used within a laminated heated vehicle window, where the heating circuit comprises an array of heating wires, depending on the design of these arrays, by including an isolated electrically conductive layer forming a capacitor with at least one of the busbars to which the heating wires are connected within the laminated structure of the window. Such heating wires are typically formed of a metal or an alloy, and are preferably copper, tungsten or an alloy thereof.

Figure 6:
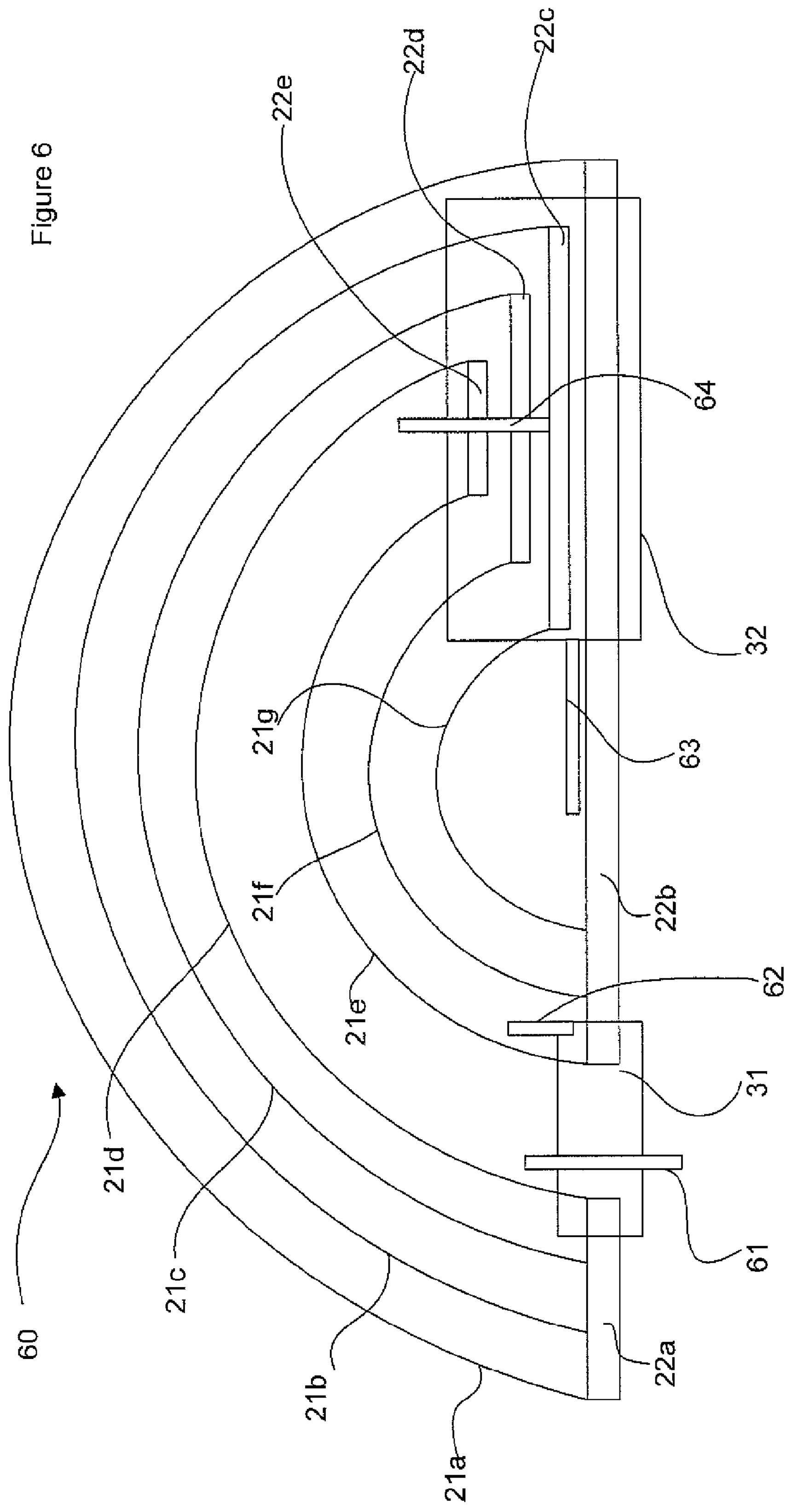
FIG. 6 is a schematic drawing of a heating circuit design for a backlight with discrete electrically conductive layer in accordance with a fourth embodiment of the present invention.

A further advantageous embodiment of the invention is illustrated in FIGS. 6, 7*a*, 7*b* and 7*c*. FIG. 6 is a schematic drawing of a heating circuit design for a backlight with two discrete electrically conductive layers in accordance with a fourth embodiment of the present invention. In addition to any antennas provided either independently or as part of the heating circuit 60, it is possible to include high frequency antennas (operating at a frequency of at least 100 MHz) by adapting the discrete electrically conductive layers used to form capacitors with the busbars. Preferably, such an antenna resonates at a frequency of at least 200 MHz, for example, 320 to 480 MHz for remote keyless entry or 480-870 Mhz for television frequencies or 6 GHz for car-to-car communication. FIG. 6 is essentially identical with FIG. 3*a* (and so like reference numerals are used for like features), except for the illustration of four possible antennas 61, 62, 63, 64, each included as part of the discrete electrically conductive layer 31, 32 used to form a capacitor with the busbars 22*a*-22*e*. Each antenna 61, 62, 63, 64 may be provided in a region of the heating circuit where there are no printed lines 21*a*-21*g*, such that the antenna is free to radiate.

The first optional antenna 61 is formed from an additional electrically conductive layer positioned so as to overlap the discrete electrically conductive layer 31. The structure of this first antenna 61 is shown in more detail in FIG. 7*a*. FIG. 7*a* is a schematic cross-section view showing a portion of the first antenna 61. In this Figure, the heating circuit 60 is shown positioned on a surface of a single ply of glazing material 46. A discrete electrically conductive layer 42 is positioned to cover at least a portion of the first busbar 22*a*, and separated by an electrically insulating layer 41, which creates direct current isolation between the discrete electrically conductive layer 42 and the first busbar 22*a*. A protective layer 43 is provided in contact with the discrete electrically conductive layer 42. On this protective layer, and aligned so as to overlap or cover the discrete electrically conductive layer 42 but not the first busbar 22*a*, a second electrically conductive layer 65 is provided, forming the antenna 61. The second electrically conductive layer 65 may be bonded to the protective layer 43 by means of an adhesive layer 66. The length of the second electrically conductive layer and its position in relation to the first busbar 22*a* and the discrete electrically conductive layer 42 are determined by the frequency it is desired for the first optional antenna 61 to radiate at. This structure is also adopted for the fourth optional antenna 64.

The second optional antenna 62 is formed from an additional portion of the discrete electrically conductive layer, which acts in conjunction with the second busbar 22*b* to form a capacitor. FIG. 7*b* is a schematic cross-section view showing a portion of the second possible antenna 62. In this Figure, the heating circuit 60 is shown positioned on a surface of a single ply of glazing 46. A discrete electrically conductive layer 42 is positioned to cover at least a portion of the second busbar 22*b*, and separated by an electrically insulating layer 41, which creates direct current isolation between the discrete electrically conductive layer 42 and the second busbar 22*b*. A protective layer 43 is provided in contact with the discrete electrically conductive layer 42. The antenna 62 is formed as an additional portion of the same electrically conductive layer as the discrete electrically conductive layer 42, for example, by shaping a thin metal sheet or an electrically conductive printed area. The antenna 62 is therefore coplanar with the discrete electrically conductive layer 42. Again, the length of the additional portion of the discrete electrically conductive layer 42 and its position in relation to the second busbar 22*b* are determined by the frequency it is desired for the second optional antenna 62 to radiate at.

The third optional antenna 63 is formed from an associated portion of the discrete electrically conductive layer, which acts in conjunction with the second busbar 22*b* to form a capacitor. However, in this example, the antenna portion 63 and main body of the discrete electrically conductive layer 42 are in electrical isolation from direct current. FIG. 7*c* is a schematic cross-section view showing a portion of the third possible antenna 63. In this Figure, the heating circuit 60 is shown positioned on a surface of a single ply of glazing material 46. A discrete electrically conductive layer 42 is positioned to cover at least a portion of the second busbar 22*b*, and separated by an electrically insulating layer 41, which creates direct current isolation between the discrete electrically conductive layer 42 and the second busbar 22*b*. A protective layer 43 is provided in contact with the discrete electrically conductive layer 42. A second electrically conductive layer 67 is provided adjacent to the discrete electrically conductive layer 42 but in direct current electrical isolation therefrom. This may be achieved by providing separate thin metallic sheets on an adhesive insulating layer, or separate printed regions of an electrically conductive ink. The conductive layers 42, 67 are co-planar. Again, the length of the additional portion of the discrete electrically conductive layer 42 and its position in relation to the second busbar 22*b* are determined by the frequency it is desired for the third optional antenna 63 to radiate at.

As described above, the discrete electrically conductive layer 42 and second electrically conductive layer 65, 67 may be formed from a thin metallic sheet material, in which case, the insulating layer 41 is formed from a double-sided tape or other adhesive material, or may be printed using an electrically conductive ink, preferably a silver-containing electrically conductive silver ink. In this latter case, the electrically insulating layer 41 is preferably formed from an electrically insulated black ceramic printed ink, such as that used to print an obscuration band. The various electrically conductive layers shown in FIGS. 7*a* and 7*c* may be formed from the same materials, for example the discrete electrically conductive layer 42 and second electrically conductive layer 65, 67 may be formed from the same materials, or from different materials. In the case of the first optional antenna 61, described above, if a thin metallic sheet material is used to form the second electrically conductive layer, this may be adhered directly to the discrete electrically conductive layer 42 by means of an adhesive layer, or may be adhered to a protective layer 43 surmounting the discrete electrically conductive layer 42, again by an adhesive. Indeed, those materials and alternatives listed in connection with the first embodiment of the present invention should be understood to be equally applicable to the other embodiments of the present invention described herein.

The invention claimed is:

1. A heated vehicle window comprising at least one ply of a glazing material, provided with an antenna and comprising an array of electrical conductors forming a heating circuit, the heating circuit comprising a plurality of electrical conductors and at least two busbars for supplying direct electrical current to which the electrical conductors are connected, wherein a discrete electrically conductive layer is provided to cover at least a portion of at least two of the busbars in direct current electrical isolation therefrom, such that the busbars and the discrete electrically conductive layer act as a capacitor in the presence of alternating electrical current.

2. The heated vehicle window of claim 1, wherein the discrete electrically conductive layer is bonded to the busbars by an electrically insulating adhesive layer.

3. The heated vehicle window of claim 1, wherein n busbars are provided, where n is an integer number, and greater than or equal to two, and the number discrete electrically conductive layers is in the range of 1 to n−1.

4. The heated vehicle window of claim 3, wherein n is at least three and wherein a direct electrical connection is made between one of the busbars and the discrete electrically conductive layer covering that busbar.

5. A heated vehicle window comprising at least one ply of a glazing material, provided with an antenna and comprising an array of electrical conductors forming a heating circuit, the heating circuit comprising a plurality of electrical conductors and at least two busbars for supplying direct electrical current to which the electrical conductors are connected, wherein a discrete electrically conductive layer is provided to cover at least a portion of at least two of the busbars, such that the busbars and the discrete electrically conductive layer act as a capacitor in the presence of alternating electrical current, and wherein there is a direct electrical connection between one of the at least two busbars and the discrete electrically conductive layer covering that busbar.

6. The heated vehicle window of claim 5, wherein n busbars are provided, where n is an integer number, and greater than or equal to two, and the number discrete electrically conductive layers is in the range of 1 to n−1.

7. The heated window of claim 4, wherein the direct electrical connection is used to connect the heating circuit to a direct current source.

8. The heated vehicle window of claim 1, wherein the electrically conductive layer is formed from a metallic thin sheet material.

9. The heated vehicle window of claim 1, wherein the electrically conductive layer is a layer of a fired electrically conductive ink, preferably a silver containing ink.

10. The heated vehicle window of claim 9, wherein the electrically conductive layer is isolated from the busbar by means of an electrically insulating fired ink.

11. The heated vehicle window of claim 1, wherein the electrically conductive layer is provided with an outer protective layer, preferably a self-adhesive polymer film or a printed black ceramic material.

12. The heated vehicle window of claim 1, wherein the electrical conductors are heating lines printed with an electrically conductive silver-containing ink.

13. The heated vehicle window of claim 1, comprising a single ply of a glazing material.

14. The heated vehicle window of claim 1, comprising two plies of a glazing material bonded together by a layer of an interlayer material.

15. The heated vehicle window of claim 14, wherein the electrical conductors are formed from metal wires.

16. The heated vehicle window of claim 1, wherein the glazing material is silicate float glass.

17. The heated window of claim 16, wherein a layer of a printed black ceramic material is provided between the silicate float glass and the electrical conductors.

18. The heated vehicle window of claim 1, wherein the glazing material is a plastics material.

19. The heated vehicle window of claim 1, wherein the discrete electrically conductive layer acts as an antenna connector.

20. The heated vehicle window of claim 1, wherein the discrete electrically conductive layer is adapted to produce another antenna having a resonant frequency of at least 100 MHz.

21. The heated vehicle window of claim 20, wherein the other antenna comprises a second electrically conductive layer, in direct current electrical isolation from the discrete electrically conductive layer.

22. The heated vehicle window of claim 21, wherein the second electrically conductive layer is adjacent the discrete electrically conductive layer.

23. The heated vehicle window of claim 21, wherein the second electrically conductive layer overlaps the discrete electrically conductive layer.

24. The heated vehicle window of claim 20, wherein the other antenna is formed from a portion of the discrete electrically conductive layer.

* * * * *